United States Patent [19]
Iketani et al.

[11] Patent Number: 5,901,118
[45] Date of Patent: May 4, 1999

[54] MAGNETO-OPTICAL RECORDING MEDIUM HAVING A READOUT LAYER AND A RECORDING LAYER

[75] Inventors: Naoyasu Iketani, Tenri; Yoshiteru Murakami, Nishinomiya; Junji Hirokane; Akira Takahashi, both of Nira, all of Japan

[73] Assignee: Sharp Kabushiki Kaisha, Osaka, Japan

[21] Appl. No.: 08/803,168

[22] Filed: Feb. 19, 1997

[30] Foreign Application Priority Data

Feb. 21, 1996 [JP] Japan .................................. 8-033665

[51] Int. Cl.$^6$ ...................................... G11B 11/00
[52] U.S. Cl. ....................................... 369/13; 428/694 ML
[58] Field of Search ................................. 369/13, 14, 110; 360/59, 114; 365/122; 428/694 ML, 694 SC, 694 MT, 694 RE, 694 MM

[56] References Cited

U.S. PATENT DOCUMENTS

| | | | |
|---|---|---|---|
| 5,633,838 | 5/1997 | Hirokane et al. | 369/13 |
| 5,640,374 | 6/1997 | Hirokane et al. | 369/13 |
| 5,648,162 | 7/1997 | Hirokane et al. | 428/694 ML |
| 5,659,537 | 8/1997 | Hirokane et al. | 369/275.2 |

FOREIGN PATENT DOCUMENTS 06150418  5/1994  Japan.

OTHER PUBLICATIONS

Hirokane, J., Takahashi, A. Magnetically Induced Super-resolution Magneto-optical Disk with Interferential Structure. The Japan Society of Applied Physics and Related Societies, No. 3, 1996, 26–29.

*Primary Examiner*—Tan Dinh
*Attorney, Agent, or Firm*—David G. Conlin; George W. Neuner

[57] ABSTRACT

A magneto-optical recording medium having a substrate whereupon a transparent dielectric layer, a readout layer showing in-plane magnetization at room temperature and perpendicular magnetization with an increase in temperature, a metal film layer, a recording layer made of a perpendicularly magnetized film, and a protective layer are formed in this order, wherein the film thickness of the readout layer is between 5 nm and 30 nm, the film thickness of the metal film layer is between 6 nm and 40 nm, and the film thickness of the recording layer is between 20 nm and 80 nm. Since recording domain information at a portion showing in-plane magnetization is masked, even when adjacent recording bit enters into the beam diameter of a light beam focused, it is possible to separately reproduce individual recording bits with high signal quality.

33 Claims, 5 Drawing Sheets

MAGNETO-OPTICAL RECORDING MEDIUM HAVING A READOUT LAYER AND A RECORDING LAYER

FIELD OF THE INVENTION

The present invention relates to magneto-optical recording media, such as magneto-optical disks, magneto-optical tapes and magneto-optical cards, for use with a magneto-optical recording and reproducing apparatus.

BACKGROUND OF THE INVENTION

Magneto-optical recording media as rewritable optical recording media have been put to practical use. However, the magneto-optical recording media suffer from such a drawback that the reproduction characteristic deteriorates when the diameter of a recording bit as a recording magnetic domain and the recording bit interval become smaller with respect to the beam diameter of a light beam which is emitted by a semiconductor laser and focused on a magneto-optical recording medium. Such a drawback arise when adjacent recording bit enters into the beam diameter of the light beam focused on a target recording bit because the entered adjacent recording bit prevents separate reproduction of individual recording bits.

In order to overcome the drawback, Japanese Publication for Unexamined Patent Application (Tokukaihei) No. 6-150418 (1994) proposes a magneto-optical recording medium constructed by placing a nonmagnetic intermediate layer between a recording layer and a readout layer which shows in-plane magnetization at room temperature and perpendicular magnetization with an increase in temperature, and is magnetostatic-coupled with the recording layer. In this structure, the recording magnetic domain information at a portion showing in-plane magnetization is masked. Therefore, even when adjacent recording bit enters into the beam diameter of the focused light beam, it is possible to separately reproduce individual recording bits.

However, according to the above-mentioned publication, Tokukaihei No. 6-150418, it was confirmed that when recording and reproduction are performed with a smaller recording bit diameter and at a smaller recording bit interval, a great magnetic field is required for recording/erasure because a leakage magnetic field produced from a magnetization in the readout layer reaches the recording layer.

SUMMARY OF THE INVENTION

It is an object of the present invention to provide a magneto-optical recording medium which allows reproduction even when recording is performed with a smaller recording bit diameter and at a smaller recording bit interval, and allows recording and erasure even with a small magnetic field.

In order to achieve the above object, a first magneto-optical recording medium of the present invention is a magneto-optical recording medium which is constructed by layering a transparent dielectric layer, a readout layer showing in-plane magnetization at room temperature and perpendicular magnetization with an increase in temperature, a metal film layer, a recording layer made of a perpendicularly magnetized film, and a protective layer in this order on a substrate, and characterized in that the film thickness of the readout layer is between 5 nm and 30 nm, the film thickness of the metal film layer is between 6 nm and 40 nm, and the film thickness of the recording layer is between 20 nm and 80 nm.

In this structure, even when recording is performed with a small recording bit diameter and at a small recording bit interval, it is possible to obtain satisfactory signal quality and provide a magneto-optical recording medium which allows recording and erasure even with a small magnetic field.

A second magneto-optical recording medium of the present invention is a magneto-optical recording medium which is constructed by layering a first transparent dielectric layer, a readout layer showing in-plane magnetization at room temperature and perpendicular magnetization with an increase in temperature, a second transparent dielectric layer, a metal film layer, a recording layer made of a perpendicularly magnetized film, and a protective layer in this order on a substrate, and characterized in that the film thickness of the readout layer is between 5 nm and 30 nm, the total film thickness of the second transparent dielectric layer and metal film layer is between 6 nm and 40 nm, and the film thickness of the recording layer is between 20 nm and 80 nm.

In this structure, even when recording is performed with a small recording bit diameter and at a small recording bit interval, it is possible to obtain satisfactory signal quality and provide a magneto-optical recording medium which allows recording and erasure even with a small magnetic field. Furthermore, this structure allows a lowering of the laser power and an increase in the CNR.

It is preferred to arrange the compensation temperature $T_{wcomp}$ of the recording layer not to be higher than 50° C., or arrange the sublattice moment of transition metal in the recording layer to be always greater than the sublattice moment of rare earth metal at temperatures between room temperature and its Curie temperature $T_{wc}$.

It is preferred to arrange the compensation temperature $T_{rcomp}$ of the readout layer not to be lower than 180° C., or arrange the sublattice moment of rare earth metal in the readout layer to be always greater than the sublattice moment of transition metal at temperatures between room temperature and its Curie temperature $T_{rc}$.

It is preferred to form a recording auxiliary layer whose Curie temperature is higher than the Curie temperature of the recording layer between the recording layer and protective layer, and arrange the total film thickness of the recording layer and recording auxiliary layer not to be less than 20 nm. In this case, it is preferred to arrange the compensation temperature of the recording auxiliary layer not to be higher than 50° C., or arrange the sublattice moment of transition metal in the recording auxiliary layer to be always greater than the sublattice moment of rare earth metal at temperatures between room temperature and its Curie temperature $T_{ic}$.

For a fuller understanding of the nature and advantages of the invention, reference should be made to the ensuing detailed description taken in conjunction with the accompanying drawings.

DETAILED DESCRIPTION OF THE PREFERRED EMBODIMENTS

EMBODIMENT 1

Figure 1:
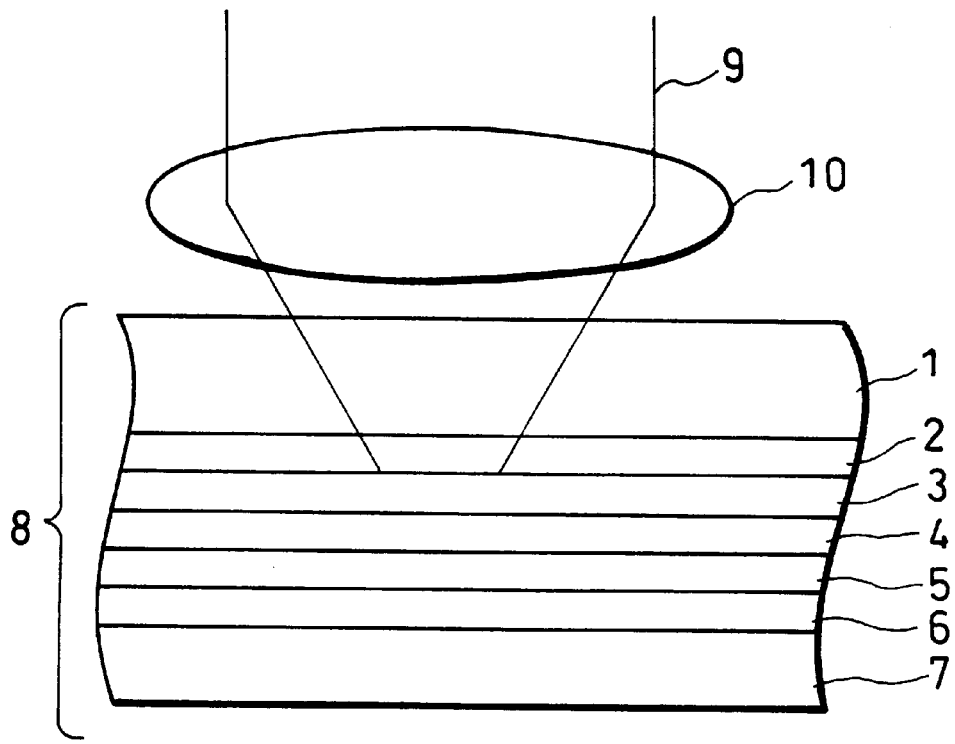
FIG. 1 is an explanatory view showing a schematic structure of a magneto-optical disk of the present invention.

The following description will discuss one embodiment of the present invention with reference to FIG. 1. In the embodiments of the present invention, a magneto-optical disk is used as a magneto-optical recording medium.

As illustrated in FIG. 1, a magneto-optical disk of this embodiment has a disk main body 8 including a substrate 1, a first transparent dielectric layer 2, a readout layer 3, a metal film layer 4, a recording layer 5, a protective layer 6, and an overcoat layer 7 layered in this order.

Such a magneto-optical disk employs a Curie temperature recording method as a recording method. In this method, a light beam 9 emitted by a semiconductor laser is focused on the readout layer 3 through an objective lens 10, and information is recorded and reproduced using a magneto-optical effect known as the polar Kerr effect. The polar Kerr effect is a phenomenon in which the direction of rotation of the plane of polarization of reflected light is reversed by the direction of magnetization perpendicular to the plane of incidence.

The substrate 1 is formed in a disk shape by a transparent base material, for example, polycarbonate. The readout layer 3 is a magnetic film made of an alloy of rare earth metal and transition metal with a thickness ranging from 5 nm to 30 nm, and the composition thereof is adjusted to produce such magnetic properties as to exhibit in-plane magnetization at room temperature and perpendicular magnetization with an increase in temperature. The metal film layer 4 is a metal film made of a single metal or an alloy of two or more kinds of metals, and its film thickness is set within a range of 6 nm to 40 nm. The recording layer 5 is a perpendicularly magnetized film of an alloy of rare earth metal and transition metal, and its film thickness is set within a range of 20 nm to 80 nm.

The readout layer 3 and the recording layer 5 are magnetostatic-coupled with each other. The magnetization direction of the readout layer 3 tends to align with the direction of a leakage magnetic field produced from the magnetization of the recording layer 5, i.e., the direction of the magnetization of the recording layer 5. However, since a portion of the readout layer 3 which shows in-plane magnetization, i.e., a portion where the temperature is not raised, does not exhibit the polar Kerr effect, it is possible to reproduce only information at a portion of the readout layer 3 which shows perpendicular magnetization, i.e., a portion where the temperature is raised by the irradiation of reproduction-use laser light. It is therefore possible to reproduce a recording magnetic domain recorded at a smaller pitch than a light beam spot.

It is necessarily to set the film thickness of the first transparent dielectric layer 2 so as to produce a satisfactory interference effect with respect to incident laser light and increase the Kerr rotation angle of the medium. In the case when the wavelength of the laser light and the refractive index of the first transparent dielectric layer 2 are given by $\lambda0$ and n, respectively, the film thickness of the first transparent dielectric layer 2 is set around $(\lambda/4n)$. For example, when the wavelength of the laser light is 680 nm, the film thickness of the first transparent dielectric layer 2 is set in a range of around 40 nm to 100 nm.

EMBODIMENT 2

Figure 2:
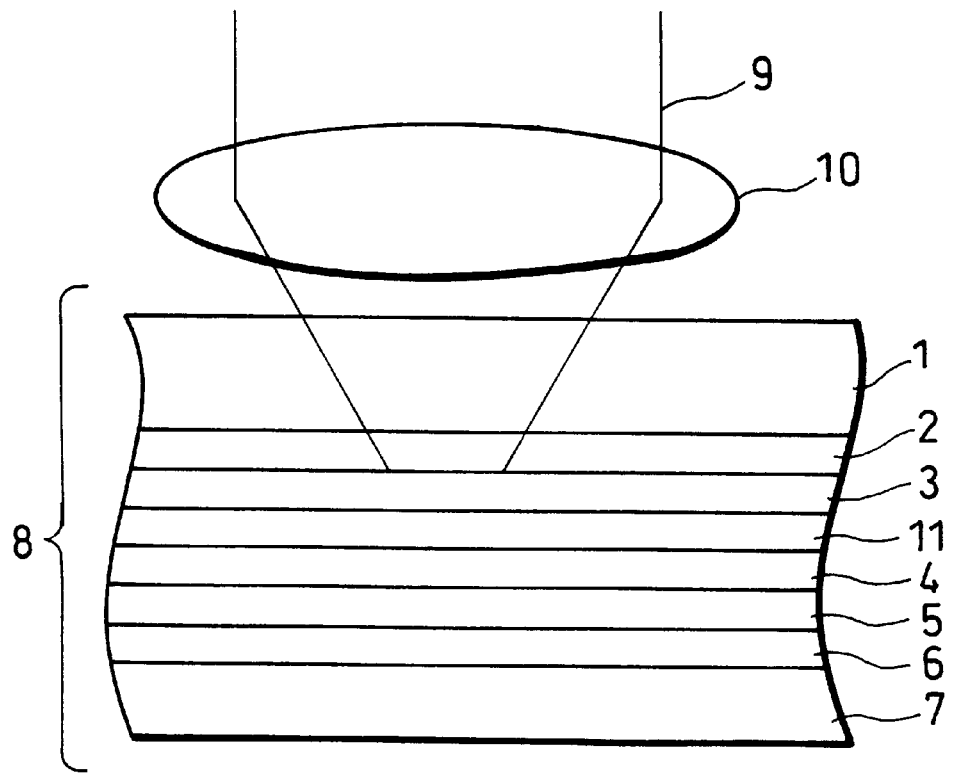
FIG. 2 is an explanatory view showing a schematic structure of another magneto-optical disk of the present invention.

The following description will discuss another embodiment of the present invention with reference to FIG. 2.

As illustrated in FIG. 2, a magneto-optical disk of this embodiment has a disk main body 8 including a substrate 1, a first transparent dielectric layer 2, a readout layer 3, a second transparent dielectric layer 11, a metal film layer 4, a recording layer 5, a protective layer 6, and an overcoat layer 7 layered in this order. The recording and reproducing operations of this embodiment are performed in the same manner as in Embodiment 1.

This embodiment achieves an improved thermal sensitivity, a lower power output of the reproduction-use laser light, and enhanced reproduced signals by placing the second transparent dielectric layer 11 adjacent to the readout layer 3.

EMBODIMENT 3

Figure 3:
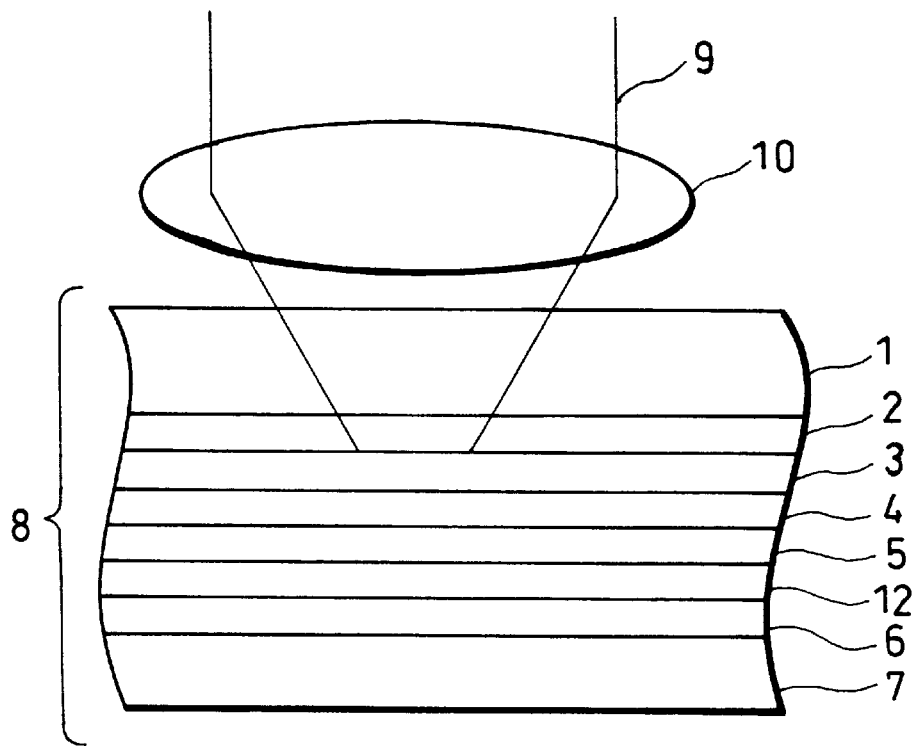
FIG. 3 is an explanatory view showing a schematic structure of still another magneto-optical disk of the present invention.
Figure 4:
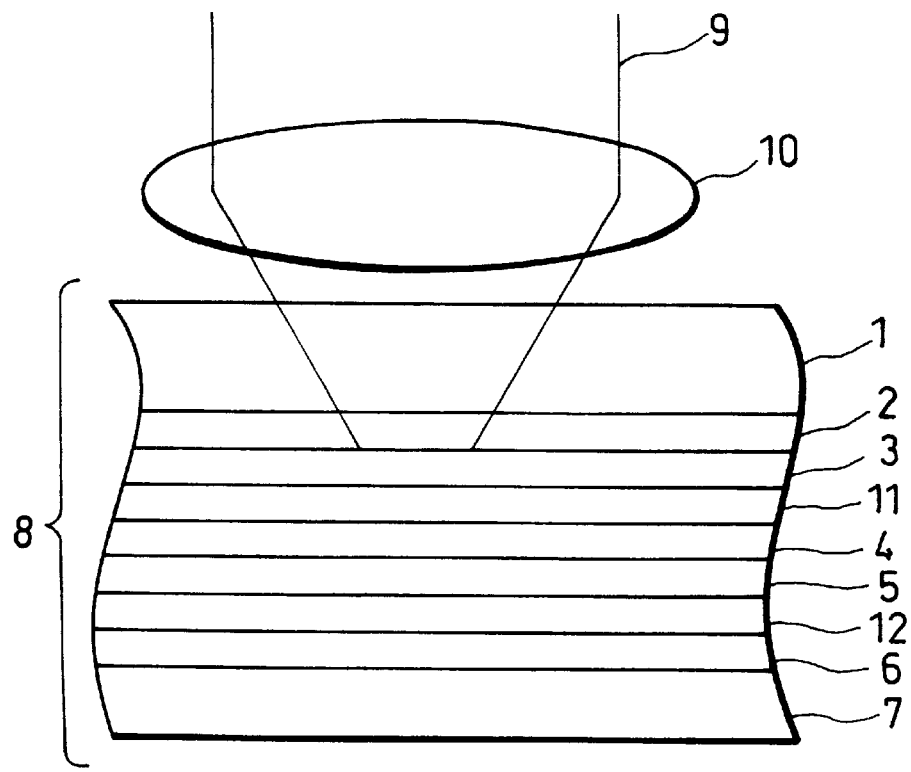
FIG. 4 is an explanatory view showing a schematic structure of yet another magneto-optical disk of the present invention.

The following description will discuss still another embodiment of the present invention with reference to FIGS. 3 and 4.

As illustrated in FIG. 3, a magneto-optical disk of this embodiment has a disk main body 8 including a substrate 1, a first transparent dielectric layer 2, a readout layer 3, a metal film layer 4, a recording layer 5, a recording auxiliary layer 12, a protective layer 6, and an overcoat layer 7 placed in this order.

Alternatively, as illustrated in FIG. 4, a magneto-optical disk of this embodiment has a disk main body 8 including a substrate 1, a first transparent dielectric layer 2, a readout layer 3, a second transparent dielectric layer 11, a metal film layer 4, a recording layer 5, a recording auxiliary layer 12, a protective layer 6, and an overcoat layer 7 placed in this order.

The recording and reproducing operations of this embodiment are performed in the same manner as in Embodiment 1.

This embodiment allows an improvement of the recording operation by forming the recording auxiliary layer 12 whose Curie temperature is higher than the Curie temperature of the recording layer 5 between the recording layer 5 and the protective layer 6.

EXAMPLE 1

A method for fabricating a magneto-optical disk of Embodiment 1 of the present invention will be explained.

First, a disk-shaped substrate 1 formed by polycarbonate with pre-grooves and pre-pits was placed in a substrate holder in a sputtering device having an Al target, a GdFeCo alloy target and a TbDyFeCo alloy target. After evacuating the sputtering device to $1 \times 10^{-6}$ Torr, a mixed gas of argon and nitrogen was introduced. By supplying power to the Al target, a first transparent dielectric layer 2 with a film thickness of 80 nm was formed by AlN on the substrate 1 under the condition of a gas pressure of $4 \times 10^{-3}$ Torr.

Next, after evacuating the sputtering device to $1 \times 10^{-6}$ Torr again, a readout layer 3 with a film thickness of 20 nm was formed by $Gd_{0.31}(Fe_{0.78}Co_{0.22})_{0.69}$ on the first transparent dielectric layer 2 by introducing an argon gas, supplying power to the GdFeCo alloy target and controlling the gas pressure to $4 \times 10^{-3}$ Torr. The readout layer 3 had such a characteristic that it exhibited in-plane magnetization at room temperature and perpendicular magnetization at 120° C., and its compensation temperature and Curie temperature were 300° C. and 360° C., respectively.

Subsequently, a metal film layer 4 with a film thickness of 20 nm was formed by Al on the readout layer 3 by introducing an argon gas and supplying power to the Al target under the condition of a gas pressure of $3 \times 10^{-3}$ Torr.

Next, after evacuating the sputtering device to $1 \times 10^{-6}$ Torr again, a recording layer 5 with a film thickness of 40 nm was formed by $(Tb_{0.75}Dy_{0.25})_{0.30}(Fe_{0.72}Co_{0.28})_{0.70}$ on the metal film layer 4 by introducing an argon gas, supplying power to the TbDyFeCo alloy target and controlling the gas pressure to $4 \times 10^{-3}$ Torr. The recording layer 5 had a compensation temperature of 25° C., and a Curie temperature of 275° C.

Thereafter, a protective layer 6 was formed by AlN on the recording layer 5 by introducing a mixed gas of argon and nitrogen and supplying power to the Al target under the condition of a gas pressure of $4 \times 10^{-3}$ Torr. At this time, in order to protect the recording layer 5 from corrosion, for example, oxidation, the film thickness of the protective layer 6 is preferably 5 nm or more. In this embodiment, the protective layer 6 was formed with a film thickness of 20 nm.

Next, an overcoat layer 7 was formed by applying an ultraviolet-ray setting resin or a thermosetting resin to the protective layer 6 with spincoating and then irradiating ultraviolet rays or performing heating.

Figure 5:
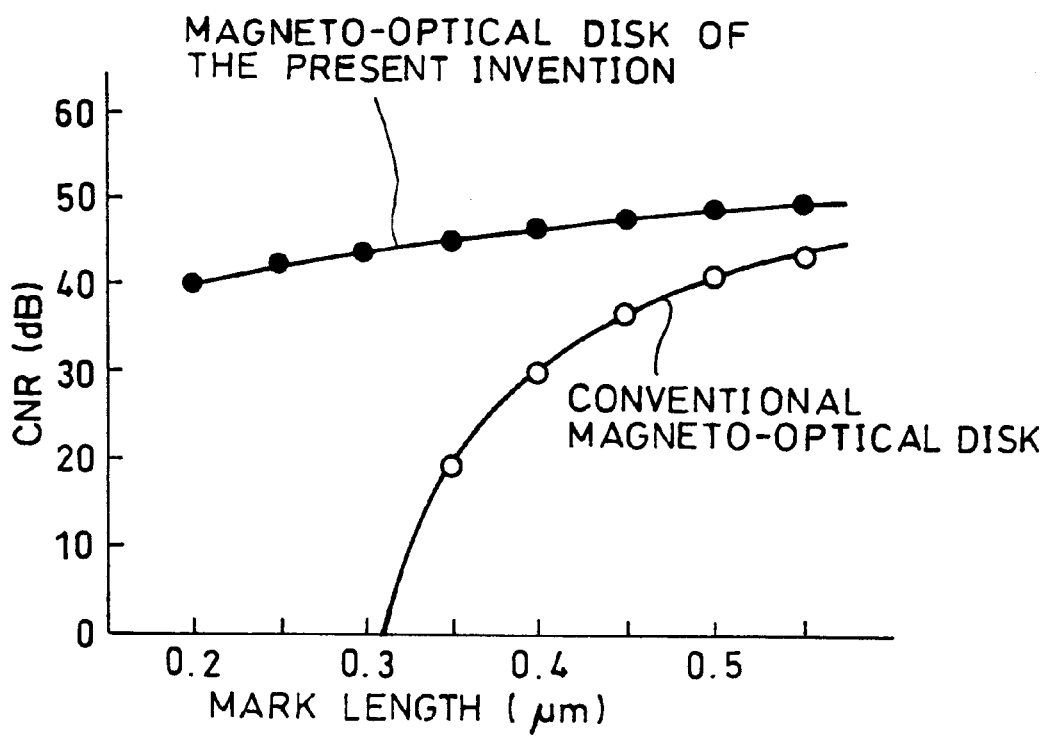
FIG. 5 is a graph showing a comparison between the reproduction characteristics of a magneto-optical disk of the present invention and a conventional magneto-optical disk.
Figure 6:
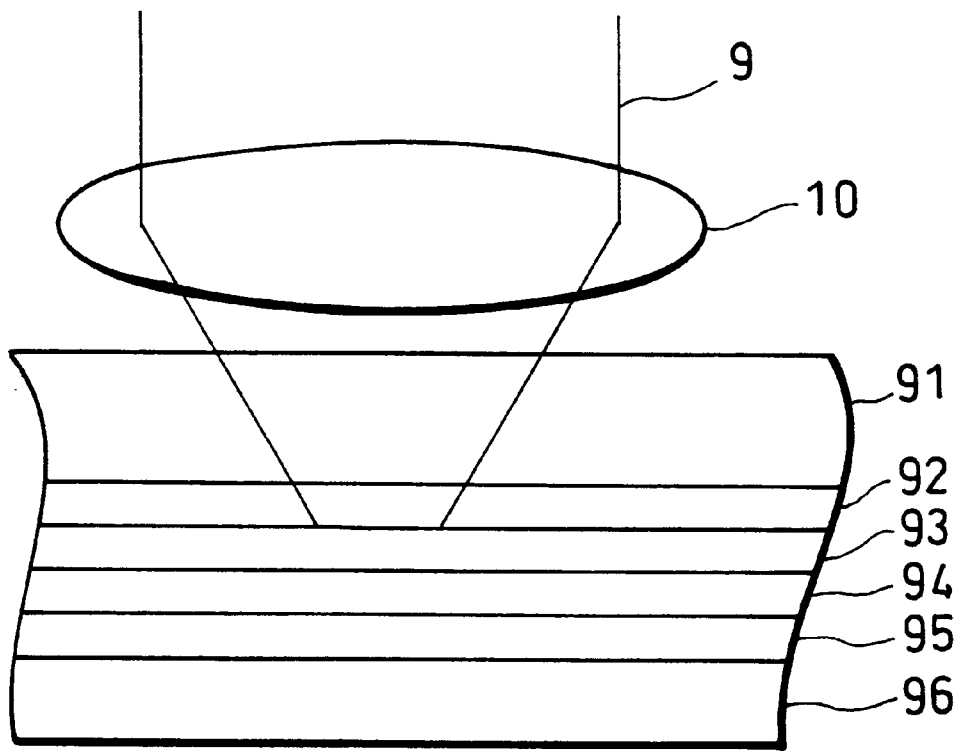
FIG. 6 is an explanatory view showing a schematic structure of a conventional magneto-optical disk.

The CNR (signal to noise ratio) was measured from the above-mentioned magneto-optical disk using an optical pickup having a semiconductor laser with a wavelength of 680 nm. The mark length dependency of the CNR is shown in FIG. 5. For comparison purposes, the mark length dependency of the CNR measured from a commercially available magneto-optical disk is also shown in FIG. 5. As shown in FIG. 6, the commercially available magneto-optical disk is constructed by a substrate 91, a first dielectric layer 92, a recording layer 93, a second dielectric layer 94, a reflective layer 95, and an overcoat layer 96.

The measurement of the CNR of the present invention was performed using an optical pickup having a semiconductor laser with a wavelength of 680 nm. In the case of a string of recording magnetic domains which were typically recorded with a mark length of 0.3 μm and a mark pitch of 0.6 μm on a commercially available magneto-optical disk, a plurality of recording magnetic domains enter into a beam spot, preventing separate reproduction of individual recording magnetic domains. Consequently, in the case of the commercially available magneto-optical disk, the CNR is zero when the mark length is 0.3 μm.

In contrast, in the case of the magneto-optical disk of the present invention, it is possible to reproduce only a portion where the temperature is raised by the irradiation of laser light and the readout layer 3 shows perpendicular magnetization. Therefore, even when the mark length is 0.3 μm, it is possible to obtain a CNR of 40.5 dB.

In a conventional magneto-optical recording medium including magnetostatic-coupled readout and recording layers, as disclosed in Japanese Publication for Unexamined Patent Application (Tokukaihei) No. 6-150418, a non-magnetic intermediate layer formed between the readout and recording layers, i.e., the metal film layer 4 of this example, is arranged as thin as 5 nm for the following reasons. In the conventional structure, the leakage magnetic field produced from the recording layer becomes smaller as the distance from the recording layer increases. Therefore, the distance between the readout layer and the recording layer is decreased, i.e., the non-magnetic intermediate layer is made thin, so as to achieve a sufficient magnetostatic coupling between the readout layer and the leakage magnetic field produced from the recording layer. However, in this example, as shown in FIG. 5, even when the film thickness of the metal film layer 4 (non-magnetic intermediate layer) is increased to 20 nm, a good super-resolution reproduction characteristic was obtained.

Next, the film thickness of the redout layer 3 and of the recording layer 5 of this example were changed, and the CNR was measured when the mark length was 0.45 μm. Table 1 shows the results of measurement.

TABLE 1

| Film thickness of readout layer (nm) | Film thickness of recording layer (nm) | CNR (dB) | Erasing magnetic field (kA/m) |
|---|---|---|---|
| 3 | 40 | 33 | 20 |
| 5 | 40 | 41 | 20 |
| 10 | 40 | 42.5 | 20 |
| 15 | 40 | 44 | 20 |
| 20 | 40 | 46.5 | 20 |
| 25 | 40 | 46.5 | 22 |
| 30 | 40 | 44 | 30 |
| 35 | 40 | 40.5 | 40 |
| 40 | 40 | 40 | 52 |
| 20 | 10 | 0 | — |
| 20 | 20 | 31 | 12 |
| 20 | 30 | 43 | 16 |
| 20 | 40 | 46.5 | 20 |
| 20 | 60 | 46.5 | 25 |
| 20 | 80 | 46.5 | 30 |
| 20 | 100 | 46.5 | 40 |

According to Table 1, when the film thickness of the readout layer 3 was 3 nm, the CNR was lowered compared to the case where the readout layer 3 was not present, and hence an improvement of the reproduction characteristic was not confirmed. The reason for this is that since the readout layer 3 was too thin, it was impossible to satisfactorily provide the readout layer 3 with such magnetic properties as to show in-plane magnetization at room temperature and perpendicular magnetization with an increase in the temperature. In order to obtain a good CNR, it is necessary for the readout layer 3 to have a film thickness of not less than 5 nm. However, if the film thickness of the readout layer 3 exceeds 35 nm, the erasing magnetic field abruptly increases, and an erasing magnetic field of at least 40 kA/m is required, resulting in increases in the size of an erasing magnetic field generating device and the power consumption. With a current magneto-optical disk drive, in order to achieve a practical erasing magnetic field, it is necessary to arrange the film thickness of the readout layer to be 30 nm or less.

In the case where the film thickness of the readout layer 3 was 20 nm and the film thickness of the recording layer 5 was 10 nm, no reproduced signals were obtained. The reason for this is that since the magnetization direction of the readout layer 3 is determined by the leakage magnetic field produced from the recording layer 5, if the film thickness of the recording layer 5 is reduced and the magnetic field generated from the recording layer 5 is decreased, the reproduction of recorded information cannot be performed. As is known from Table 1, in the structure of the present invention, it is necessary to arrange the film thickness of the recording layer 5 to be 20 nm or more.

According to a judgement made based only on the reproduction characteristic (CNR), although there is no upper limit of the film thickness of the recording layer 5, a great erasing magnetic field is required when the recording layer 5 is too thick. In order to produce an erasing magnetic field of not less than 31 kA/m, a large magnetic field generating device is required, resulting in an increase in the size of a magneto-optical recording and reproducing apparatus. Thus, in order to achieve a practical erasing magnetic field (of not more than 31 kA/m), it is necessary to arrange the film thickness of the recording layer 5 to be 80 nm or less.

Next, the film thickness of the metal film layer 4 of Example 1 was changed, and the CNR and erasing magnetic field when the mark length was 0.45 $\mu$m were measured. Table 2 shows the results of measurement.

TABLE 2

| Film thickness of metal film layer (nm) | CNR (dB) | Erasing magnetic field (kA/m) |
|---|---|---|
| 3 | 47.0 | 52 |
| 4 | 46.5 | 49 |
| 5 | 47.0 | 42 |
| 6 | 47.5 | 30 |
| 7 | 47.5 | 22 |
| 8 | 47.5 | 20 |
| 10 | 47.0 | 20 |
| 15 | 47.5 | 20 |
| 20 | 46.5 | 20 |
| 30 | 46.0 | 20 |
| 40 | 45.5 | 20 |
| 50 | 40.5 | 20 |

As is known from Table 2, when the film thickness of the metal film layer 4 is 5 nm or less, the erasing magnetic field abruptly increases. The reason for this is that when the film thickness of the metal film layer 4 is reduced, the distance between the readout layer 3 and the recording layer 5 decreases. With a decrease of the distance between the readout layer 3 and the recording layer 5, the influence of the leakage magnetic field produced from the readout layer 3 on the recording layer 5 increases, and the erasing magnetic field increases.

When the film thickness of the metal film layer 8 is not less than 8 nm, since the leakage magnetic field produced from the readout layer 3 does not affect the recording characteristic at all, the erasing magnetic field is determined only by the recording characteristic of the recording layer 5, and shows a constant value of 20 kA/m.

An increase in the erasing magnetic field causes increases in the size of the magnetic field generating device and the power consumption of the magneto-optical disk drive. In the current magneto-optical disk drive, since the practical erasing magnetic field is not greater than 31 kA/m, it is necessary for the metal film layer 4 to have a film thickness of not less than 6 nm.

During reproduction, since the magnetization direction of the readout layer 3 is determined by the leakage magnetic field produced from the recording layer 5, when the film thickness of the metal film layer 4 is increased to 50 nm, the leakage magnetic field produced from the recording layer 5 does not sufficiently reach the readout layer 3, causing deterioration of the CNR. In order to obtain good signal quality, i.e., a high CNR, it is necessary to arrange the film thickness of the metal film layer 4 to be 40 nm or less.

EXAMPLE 2

Figure 7:
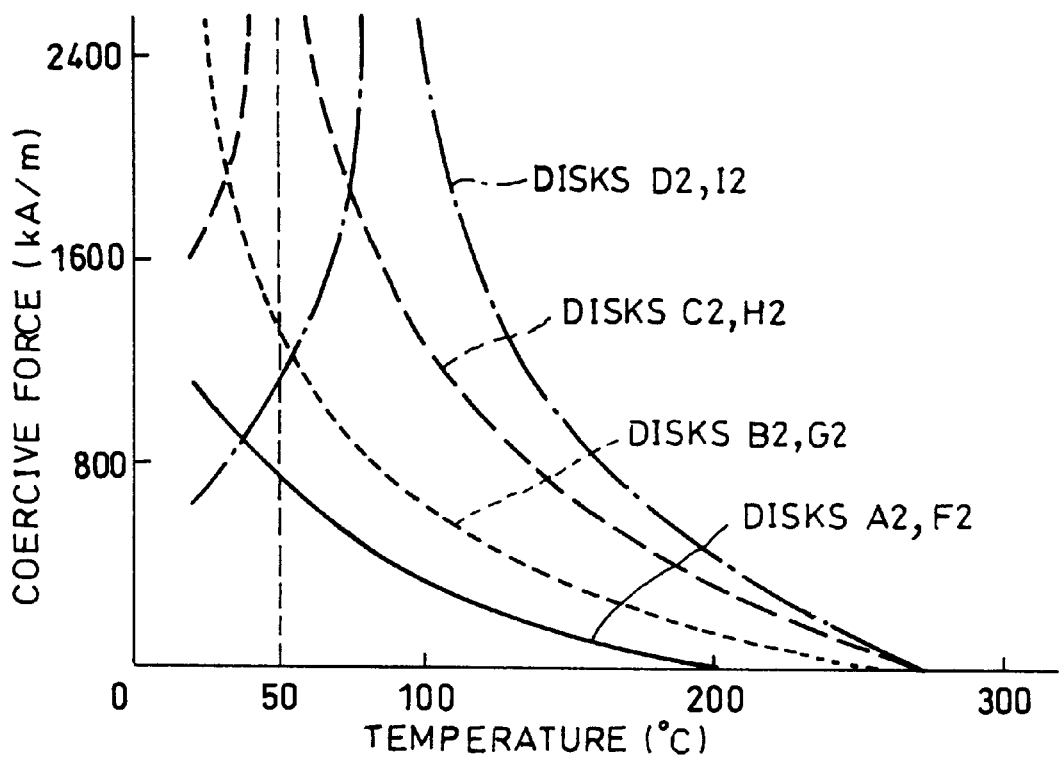
FIG. 7 is a graph showing the magnetic properties of a recording layer of a magneto-optical disk of the present invention.
Figure 8:
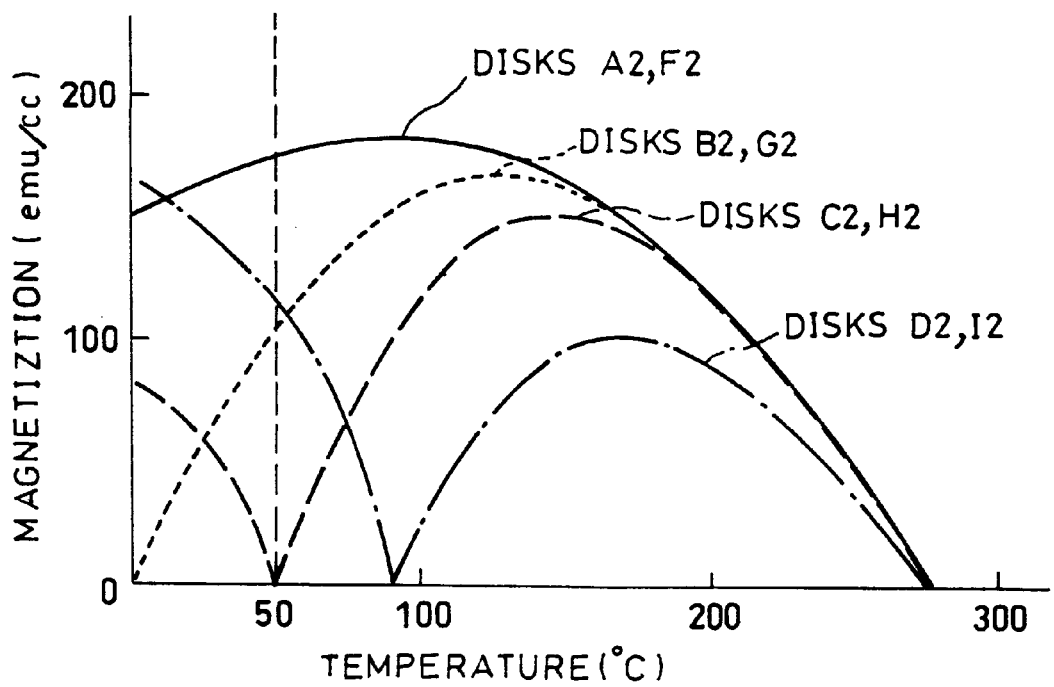
FIG. 8 is a graph showing the magnetic properties of a recording layer of a magneto-optical disk of the present invention.

Next, with the use of the structure of Example 1, magneto-optical disks were fabricated by only changing the composition of the recording layer 5, and their recording and reproduction characteristics were measured. The composition, compensation temperature and Curie temperature of each disk are shown in Table 3. The temperature dependence of the coercive force and the temperature dependence of the magnetization of the recording layer 5 are shown in FIGS. 7 and 8, respectively. The temperatures were measured in Celsius (° C.).

TABLE 3

| | Composition | Compensation temp. | Curie temp. |
|---|---|---|---|
| Disks A2, F2 | $(Tb_{0.75}Dy_{0.25})_{0.22}(Fe_{0.72}Co_{0.28})_{0.78}$ | — | 275 |
| Disks B2, G2 | $(Tb_{0.75}Dy_{0.25})_{0.30}(Fe_{0.72}Co_{0.28})_{0.70}$ | 25 | 275 |
| Disks C2, H2 | $(Tb_{0.75}Dy_{0.25})_{0.32}(Fe_{0.72}Co_{0.28})_{0.68}$ | 50 | 275 |
| Disks D2, I2 | $(Tb_{0.75}Dy_{0.25})_{0.34}(Fe_{0.72}Co_{0.28})_{0.66}$ | 90 | 275 |

Like Example 1, the CNR was measured from each of disks A2 to D2 using an optical pickup having a semiconductor laser with a wavelength of 680 nm under the optimum reproduction conditions when the mark length was 0.45 $\mu$m. The results of measurement are shown in Table 4.

TABLE 4

| | CNR (dB) | Erasing magnetic field (kA/m) |
|---|---|---|
| Disk A2 | 47.5 | 24 |
| Disk B2 | 46.5 | 20 |
| Disk C2 | 45 | 17 |
| Disk D2 | 20.5 | 15 |

It was found by comparing the reproduction characteristics of the disks A2 to D2 that a good CNR was obtained from the disks A2 to C2, but the CNR of the disk D2 was only 20.5 dB. These results are understandable from the magnetic properties (shown in FIGS. 7 and 8) of the respective disks.

Since the magnetization direction of the readout layer 3 of the magneto-optical medium of the present invention is determined by the leakage magnetic field produced from the recording layer 5, when the leakage magnetic field produced from the recording layer 5 decreases, the reproduction of recorded information cannot be performed. The leakage magnetic field produced from the recording layer 5 is proportional to the magnitude of the magnetization of the recording layer 5. Therefore, it is necessary for the recording layer 5 to have a sufficiently large magnetization and generate a sufficiently large leakage magnetic field at temperatures at which the magnetization direction of the readout layer 3 changes from in-plane magnetization to perpendicular magnetization, i.e., at temperatures between 100° C. and 150° C.

As is clear from FIG. 8, in the case of the disks A2 to C2, since the compensation temperature of the recording layer 5 is not near the temperatures (between 100° C. and 150° C.) at which the magnetization direction of the readout layer 3 changes from in-plane magnetization to perpendicular magnetization, the recording layer 5 has a sufficiently large magnetization and can produce a sufficiently large leakage magnetic field. However, in the case of the disk D2, since the compensation temperature of the recording layer 5 is close to the temperatures (between 100° C. and 150° C.) at which the magnetization direction of the readout layer 3 changes from in-plane magnetization to perpendicular magnetization, the recording layer 5 has a small magnetization and cannot produce a leakage magnetic field necessary for reproduction.

For the reasons mentioned above, the magnetic properties of the recording layer 5 are set so that the compensation temperature is not higher than 50° C. (for the disks B2 and C2), or the sublattice moment of transition metal is always greater than the sublattice moment of rare earth metal at temperatures between room temperature and the Curie temperature $T_{wc}$ of the recording layer 5 (for the disk A2).

EXAMPLE 3

Figure 9:
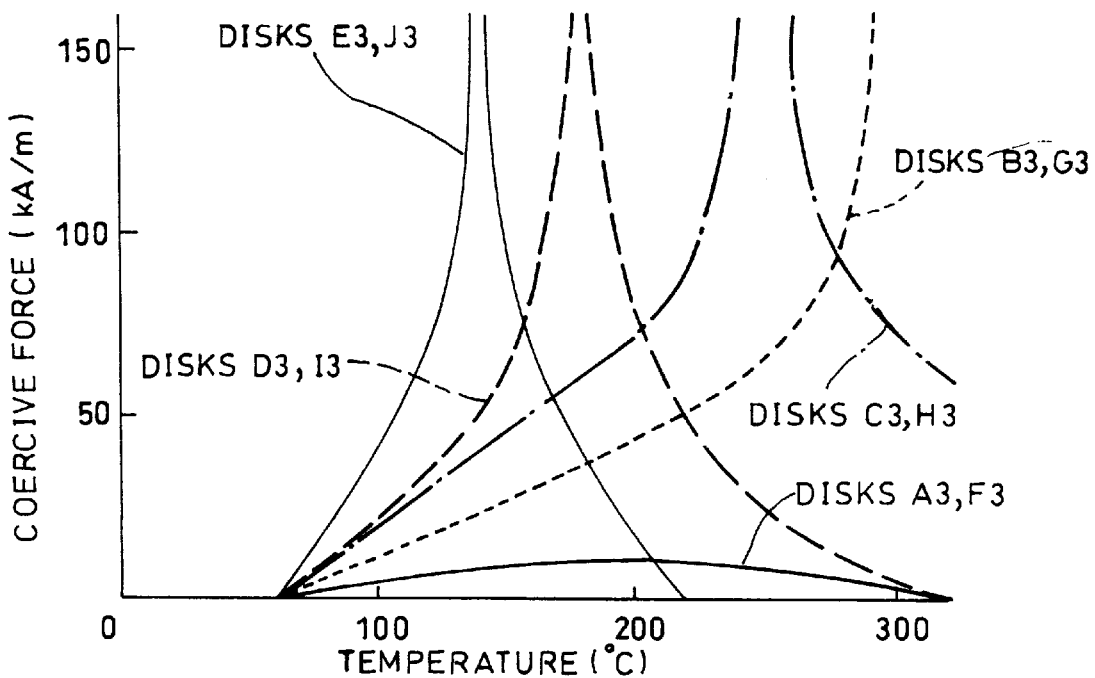
FIG. 9 is a graph showing the magnetic properties of a readout layer of a magneto-optical disk of the present invention.
Figure 10:
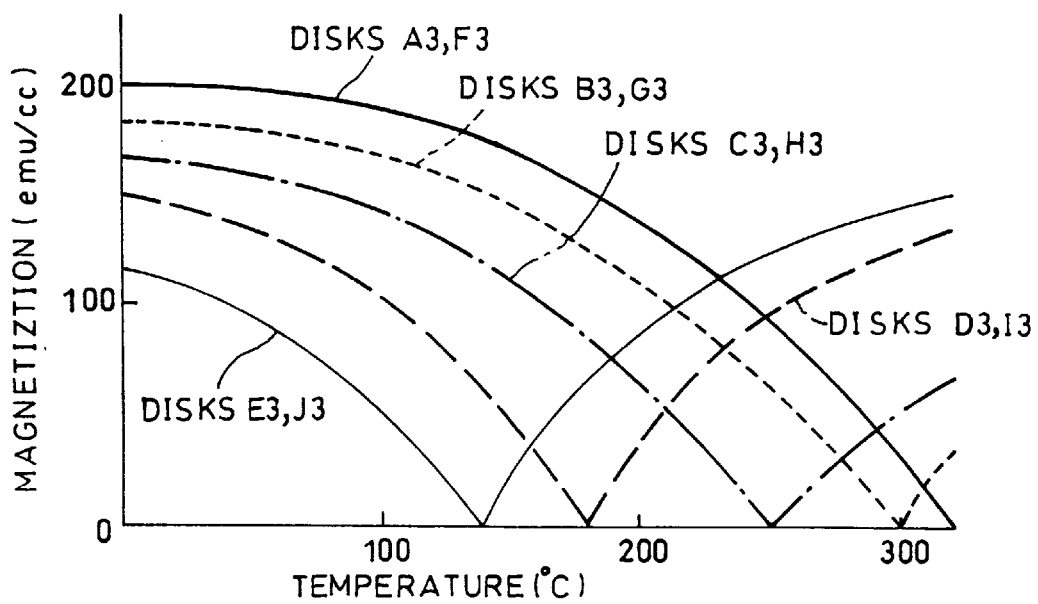
FIG. 10 is a graph showing the magnetic properties of a readout layer of a magneto-optical disk of the present invention.

Next, with the use of the structure of Example 1, magneto-optical disks were fabricated by only changing the composition of the readout layer 3, and their recording and reproduction characteristics were measured. The composition, compensation temperature and Curie temperature of each disk are shown in Table 5. The temperature dependence of the coercive force and the temperature dependence of the magnetization of the readout layer 3 are shown in FIGS. 9 and 10, respectively. The temperatures were measured in Celsius (° C.).

TABLE 5

|  | Composition | Compensation temp. | Curie temp. |
| --- | --- | --- | --- |
| Disks A3, F3 | $Gd_{0.31}(Fe_{0.82}Co_{0.18})_{0.69}$ | — | 320 |
| Disks B3, G3 | $Gd_{0.31}(Fe_{0.78}Co_{0.22})_{0.69}$ | 300 | 360 |
| Disks C3, H3 | $Gd_{0.31}(Fe_{0.72}Co_{0.28})_{0.69}$ | 250 | 380 |
| Disks D3, I3 | $Gd_{0.31}(Fe_{0.63}Co_{0.37})_{0.69}$ | 180 | 400 |
| Disks E3, J3 | $Gd_{0.31}(Fe_{0.60}Co_{0.40})_{0.69}$ | 140 | 420 |

Like Example 1, the CNR was measured from each of the disks A3 to E3 using an optical pickup having a semiconductor laser with a wavelength of 680 nm under the optimum reproduction conditions when the mark length was 0.45 μm. The results of measurement are shown in Table 6.

TABLE 6

|  | CNR (dB) | Erasing magnetic field (kA/m) |
| --- | --- | --- |
| Disk A3 | 45 | 20 |
| Disk B3 | 46.5 | 17 |
| Disk C3 | 47 | 20 |
| Disk D3 | 45 | 24 |
| Disk E3 | 30 | 40 |

It was found by comparing the reproduction characteristics of the disks A3 to E3 that good CNR was obtained from the disks A3 to D3, but the CNR of the disk E3 was only 30 dB. These results are understandable from the magnetic properties (shown in FIGS. 9 and 10) of the respective disks.

Since the magnetization direction of the readout layer 3 of the magneto-optical medium of the present invention is determined by the leakage magnetic field produced from the recording layer 5, when the magnetization of the readout layer 3 decreases, the magnetostatic coupling between the readout layer 3 and the leakage magnetic field produced from the recording layer 5 becomes weaken, and the reproduction of recorded information cannot be performed. Therefore, it is necessary for the readout layer 3 to have a sufficiently large magnetization and achieve a sufficient magnetostatic-coupling with the leakage magnetic field produced from the recording layer 5 at temperatures at which the magnetization direction of the readout layer 3 changes from in-plane magnetization to perpendicular magnetization, i.e., temperatures between 100° C. and 150° C.

As is known from FIG. 10, in the case of the disks A3 to D3, since the compensation temperature of the readout layer 3 is not near the temperatures (between 100° C. and 150° C.) at which the magnetization direction of the readout layer 3 changes from in-plane magnetization to perpendicular magnetization, the readout layer 3 has a sufficiently large magnetization and can be sufficiently magnetostatic-coupled with the leakage magnetic field produced from the recording layer 5. However, in the case of the disk E3, since the compensation temperature of the readout layer 3 is close to the temperatures (between 100° C. and 150° C.) at which the magnetization direction of the readout layer 3 changes from in-plane magnetization to perpendicular magnetization, the readout layer 3 has a small magnetization. Therefore, a sufficient magnetostatic coupling cannot be achieved.

Moreover, in the case of the disk E3, at the Curie temperature (275° C.) of the recording layer 5, since the readout layer 3 has a greater magnetization compared to the disks A3 to D3, the leakage magnetic field produced from the readout layer 3 affects the recording and erasing characteristics. Thus, the disk E3 requires a large erasing magnetic field as shown in Table 6.

For the reasons mentioned above, the magnetic properties of the readout layer 3 are set so that the readout layer 3 exhibits in-plane magnetization at room temperature and perpendicular magnetization with an increase in temperature, and the compensation temperature is not lower than 180° C. (for the disks B3 to D3), or the sublattice moment of rare earth metal is always greater than the sublattice moment of transition metal up to the Curie temperatures $T_{rc}$ of the readout layer 3 (for the disk A3).

EXAMPLE 4

The following description will discuss a process for fabricating a magneto-optical disk of Embodiment 2. The process for fabricating a magneto-optical disk of this embodiment is the same as that of Embodiment 1 except that a second transparent dielectric layer 11 is formed in this embodiment.

After forming the first transparent dielectric layer 2 and the readout layer 3 on the substrate 1, the sputtering device was evacuated to $1 \times 10^{-6}$ Torr. Then, by supplying power to the Al target with a gas pressure of $4 \times 10^{-3}$ Torr under the atmosphere of argon and nitrogen gases, the second transparent dielectric layer 11 with a film thickness of 20 nm was formed by AlN on the readout layer 3. Thereafter, by forming the 5-nm-thick metal film layer 4, recording layer 5, protective layer 6 and overcoat layer 7, a magneto-optical disk was fabricated.

The film thickness of each of the second transparent dielectric layer 11 and the metal film layer 4 of Example 4 was changed, and the CNR and erasing magnetic field when the mark length was 0.45 μm were measured. The results of measurement are shown in Table 7. The measurement was performed using a semiconductor laser having a wavelength of 680 nm.

TABLE 7

| Film thickness of second transparent dielectric layer (nm) | Film thickness of metal film layer (nm) | Total film thickness (nm) | CNR (dB) | Erasing magnetic field (kA/m) |
|---|---|---|---|---|
| 2  | 2  | 4  | 47.0 | 53 |
| 3  | 3  | 6  | 47.5 | 30 |
| 5  | 5  | 10 | 47.5 | 20 |
| 5  | 10 | 15 | 47.5 | 20 |
| 20 | 5  | 25 | 48.0 | 20 |
| 5  | 20 | 25 | 47.5 | 20 |
| 20 | 10 | 30 | 48.0 | 20 |
| 5  | 30 | 35 | 47.5 | 20 |
| 35 | 5  | 40 | 48.5 | 20 |
| 30 | 10 | 40 | 48.5 | 20 |
| 20 | 20 | 40 | 48.5 | 20 |
| 10 | 30 | 40 | 48.5 | 20 |
| 45 | 5  | 50 | 42.0 | 20 |
| 40 | 10 | 50 | 42.5 | 20 |
| 30 | 20 | 50 | 42.5 | 20 |
| 20 | 30 | 50 | 43.0 | 20 |
| 10 | 40 | 50 | 42.5 | 20 |

As is known from Table 7, when the total film thickness of the second transparent dielectric layer 11 and the metal film layer 4 was as thin as 4 nm, the erasing magnetic field increased like Example 1. The reason for this is that as the total film thickness of the second transparent dielectric layer 11 and the metal film layer 4 was reduced and the readout layer 3 and the recording layer 5 got closer to each other, the influence of the leakage magnetic field produced from the readout layer 3 on the recording layer 5 was enhanced, and the erasing magnetic field was increased.

When the total film thickness of the second transparent dielectric layer and the metal film layer 4 is not less than 10 nm, the leakage magnetic field produced from the readout layer 3 does not affect the recording characteristic at all, and the erasing magnetic field is determined only by the recording characteristic of the recording layer 5 and shows a constant value of 20 kA/m.

An increase in the erasing magnetic field causes increases in the size of the magnetic field generating device and the power consumption of the magneto-optical disk drive. In the current magneto-optical disk drive, since the practical erasing magnetic field is not greater than 31 kA/m, at least 6 nm is required as the total film thickness of the second transparent dielectric layer 11 and the metal film layer 4.

During reproduction, since the magnetization direction of the readout layer 3 is determined by the leakage magnetic field produced from the recording layer 5, when the total film thickness of the second transparent dielectric layer 11 and the metal film layer 4 is increased to 50 nm, the leakage magnetic field produced from the recording layer 5 does not sufficiently reach the readout layer 3, deteriorating the CNR. In order to obtain good signal quality, i.e., a high CNR, it is necessary to arrange the total film thickness of the second transparent dielectric layer 11 and the metal film layer 4 to be 40 nm or less.

Moreover, it was found from a comparison between Example 1 and this example that when the film thickness of the metal film layer 4 was the same, a higher CNR and a lowering of reproduction laser power were achieved by providing the second transparent dielectric layer 11. The reason for this would be an improvement of the thermal sensitivity which was achieved by providing the second transparent dielectric layer 11.

EXAMPLE 5

Next, with the use of the structure of Example 4, magneto-optical disks were fabricated by only changing the composition of the recording layer 5, and their recording and reproduction characteristics were measured. The composition of the recording layer 5 was changed in the same manner as in Example 2. The composition, compensation temperature and Curie temperature of the recording layer 5 of each disk are shown in Table 3. The temperature dependence of the coercive force and the temperature dependence of the magnetization of the recording layer 5 are shown in FIGS. 7 and 8, respectively. The temperatures were measured in Celsius (° C.).

Like Example 1, the CNR was measured from each of the disks F2 to I2 using an optical pickup having a semiconductor laser with a wavelength of 680 nm under the optimum reproduction conditions when the mark length was 0.45 μm. The results of measurement are shown in Table 8.

TABLE 8

|  | CNR (dB) | Erasing magnetic field (kA/m) |
|---|---|---|
| Disk F2 | 48.5 | 24 |
| Disk G2 | 47.0 | 20 |
| Disk H2 | 45   | 17 |
| Disk I2 | 20.5 | 15 |

It was found by comparing the reproduction characteristics of the disks F2 to I2 that good CNR was obtained from the disks F2 to H2, but the CNR of the disk I2 was only 20.5 dB. These results are understandable from the magnetic properties (shown in FIGS. 7 and 8) of the respective disks.

Since the magnetization direction of the readout layer 3 of the magneto-optical medium of the present invention is determined by the leakage magnetic field produced from the recording layer 5, when the leakage magnetic field produced from the recording layer 5 decreases, the reproduction of recorded information cannot be performed. The leakage magnetic field produced from the recording layer 5 is proportional to the magnitude of the magnetization of the recording layer 5. Therefore, it is necessary for the recording layer 5 to have a sufficiently large magnetization and produce a sufficiently large leakage magnetic field at temperatures at which the magnetization direction of the readout layer 3 changes from in-plane magnetization to perpendicular magnetization, i.e., temperatures between 100° C. and 150° C.

As is known from FIG. 8, in the case of the disks F2 to H2, since the compensation temperature of the recording layer 5 is not near the temperatures (between 100° C. and 150° C.) at which the magnetization direction of the readout layer 3 changes from in-plane magnetization to perpendicular magnetization, the recording layer 5 has a sufficiently large magnetization and can produce a sufficiently large leakage magnetic field. However, in the case of the disk I2, since the compensation temperature of the recording layer 5 is close to the temperatures (between 100° C. and 150° C.) at which the magnetization direction of the readout layer 3 changes from in-plane magnetization to perpendicular magnetization, the recording layer 5 has a small magnetization and cannot produce a leakage magnetic field necessary for reproduction.

For the reasons mentioned above, the magnetic properties of the recording layer 5 are set so that the compensation temperature is not higher than 50° C. (for the disks G2 and H2), or the sublattice moment of transition metal is always greater than the sublattice moment of rare earth metal at temperatures between room temperature and the Curie temperature $T_{wc}$ of the recording layer 5 (for the disk F2).

EXAMPLE 6

Next, with the use of the structure of Example 4, magneto-optical disks were fabricated by only changing the composition of the readout layer 3, and their recording and reproduction characteristics were measured. The composition, compensation temperature and Curie temperature of the readout layer 3 of each disk are shown in Table 5. The temperature dependence of the coercive force and the temperature dependence of the magnetization of the readout layer 3 are shown in FIGS. 9 and 10, respectively. The temperatures were measured in Celsius (° C.).

Like Example 1, the CNR was measured from each of the disks F3 to J3 using an optical pickup having a semiconductor laser with a wavelength of 680 nm under the optimum reproduction conditions when the mark length was 0.45 μm. The results of measurement are shown in Table 9.

TABLE 9

|  | CNR (dB) | Erasing magnetic field (kA/m) |
|---|---|---|
| Disk F3 | 46 | 20 |
| Disk G3 | 48 | 18 |
| Disk H3 | 48 | 21 |
| Disk I3 | 46 | 25 |
| Disk J3 | 31 | 41 |

It was found by comparing the reproduction characteristics of the disks F3 to J3 that good CNR was obtained from the disks F3 to I3, but the CNR of the disk J3 was only 30 dB. These results are understandable from the magnetic properties (shown in FIGS. 9 and 10) of the respective disks.

Since the magnetization direction of the readout layer 3 of the magneto-optical medium of the present invention is determined by the leakage magnetic field produced from the recording layer 5, when the magnetization of the readout layer 3 decreases, the magnetostatic coupling between the readout layer 3 and the leakage magnetic field produced from the recording layer 5 becomes weaker, and the reproduction of recorded information cannot be performed. Therefore, it is necessary for the readout layer 3 to have a sufficiently large magnetization and achieve a sufficient magnetostatic-coupling with the leakage magnetic field produced from the recording layer 5 at temperatures at which the magnetization direction of the readout layer 3 changes from in-plane magnetization to perpendicular magnetization, i.e., temperatures between 100° C. and 150° C.

As is known from FIG. 10, in the case of the disks F3 to I3, since the compensation temperature of the readout layer 3 is not near the temperatures (between 100° C. and 150° C.) at which the magnetization direction of the readout layer 3 changes from in-plane magnetization to perpendicular magnetization, the readout layer 3 has a sufficiently large magnetization and can be sufficiently magnetostatic-coupled with the large leakage magnetic field produced from the recording layer 5. However, in the case of the disk J3, since the compensation temperature of the readout layer 3 is close to the temperatures (between 100° C. and 150° C.) at which the magnetization direction of the readout layer 3 changes from in-plane magnetization to perpendicular magnetization, the readout layer 3 has a small magnetization. Therefore, a sufficient magnetostatic coupling cannot be achieved.

Moreover, in the case of the disk J3, at the Curie temperature (275° C.) of the recording layer 5, since the readout layer 3 has a greater magnetization compared to the disks F3 to I3, the leakage magnetic field produced from the readout layer 3 affects the recording and erasing characteristics. Thus, the disk J3 requires a large erasing magnetic field as shown in Table 9.

For the reasons mentioned above, the magnetic properties of the readout layer 3 are set so that the readout layer 3 shows in-plane magnetization at room temperature, perpendicular magnetization with an increase in temperature, and has a compensation temperature of not lower than 180° C. (for the disks G3 to I3), or the sublattice moment of rare earth metal is always greater than the sublattice moment of transition metal up to the Curie temperatures $T_{rc}$ thereof (for the disk F3).

EXAMPLE 7

The following description will discuss a process for fabricating a magneto-optical disk of Embodiment 3. The process for fabricating a magneto-optical disk of this embodiment is the same as that of Embodiments 1 and 2 except that a recording auxiliary layer 12 is formed in this embodiment.

A magneto-optical disk shown in FIG. 3 was fabricated by forming the first transparent dielectric layer 2, readout layer 3, metal film layer 4 and recording layer 5, forming the recording auxiliary layer 12 with a film thickness of 20 nm by $Gd_{0.24}$ $(Fe_{0.83}Co_{0.17})_{0.76}$ on the recording layer 5 by evacuating the sputtering device to $1\times10^{-6}$ Torr, introducing an argon gas, supplying power to the GdFeCo alloy target provided for the formation of the recording auxiliary layer 12, and controlling the gas pressure to $4\times10^{-3}$ Torr, and then forming the protective layer 6 and overcoat layer 7. The recording auxiliary layer 12 had a compensation temperature of not higher than 25° C., and its Curie temperature was 290° C. In this example, the magneto-optical disk shown in FIG. 3 is referred to as the disk A6.

A magneto-optical disk shown in FIG. 4 was fabricated by forming the first transparent dielectric layer 2, readout layer 3, second transparent dielectric layer 11, metal film layer 4 and recording layer 5, forming the recording auxiliary layer 12 with a film thickness of 20 nm by $Gd_{0.24}$ $(Fe_{0.83}Co_{0.17})_{0.76}$ on the recording layer 5 by evacuating the sputtering device to $1\times10^{-6}$ Torr, introducing an argon gas and supplying power to the GdFeCo alloy target provided for the formation of the recording auxiliary layer 12, and then forming the protective layer 6 and overcoat layer 7. This recording auxiliary layer 12 had a compensation temperature of not higher than 25° C., and its Curie temperature was 290° C. like the recording auxiliary layer 12 shown in FIG. 3. In this example, the magneto-optical disk shown in FIG. 4 is referred to as the disk B6.

The CNR and the magnetic field necessary for erasing a recording magnetic domain (erasing magnetic field) of each of the magneto-optical disks A6 and B6 were measured using an optical pickup having a semiconductor laser with a wavelength of 680 nm under the optimum reproduction conditions when the mark length was 0.45 μm. The results of measurement are shown in Table 10. For comparison purposes, the characteristics of the disk B2 of Embodiment 1 is also shown in Table 10.

TABLE 10

|  | CNR (dB) | Erasing magnetic field (kA/m) |
|---|---|---|
| Disk B2 | 47.0 | 20.0 |
| Disk A6 | 47.0 | 7.5 |
| Disk B6 | 48.5 | 7.5 |

It was confirmed from Table 10 that an erasing magnetic field of 20.0 kA/m is required for the disk B2 of Embodiment 1, and erasure is carried out with an erasing magnetic field of 7.5 kA/m on the disks A6 and B6 of Embodiment 3. These results mean that a lowering of the erasing magnetic field was achieved by the erasing operation lead by the recording auxiliary layer 12 (GdFeCo) whose Curie temperature (290° C.) was higher than the Curie temperature (275° C.) of the recording layer 5 (TbDyFeCo) and whose magnetization was more easily reversed than that of the recording layer 5.

Next, the film thickness of each of the readout layer 3, recording auxiliary layer 12 and recording layer 5 of the disk A6 was changed, and the CNR when the mark length was 0.45 μm was measured. Table 11 shows the results of measurement.

TABLE 11

| Film thickness (nm) | | | | |
|---|---|---|---|---|
| Readout layer | Recording auxiliary layer | Recording layer | CNR (dB) | Erasing magnetic field (kA/m) |
| 3 | 20 | 40 | 36.0 | 7.5 |
| 5 | 20 | 40 | 43.0 | 7.5 |
| 10 | 20 | 40 | 45.0 | 7.5 |
| 15 | 20 | 40 | 46.0 | 7.5 |
| 20 | 20 | 40 | 47.5 | 7.5 |
| 25 | 20 | 40 | 47.5 | 9.5 |
| 30 | 20 | 40 | 47.5 | 18.5 |
| 35 | 20 | 40 | 47.0 | 37.5 |
| 40 | 20 | 40 | 46.5 | 47.5 |
| 20 | 5 | 5 | 0 | — |
| 20 | 10 | 10 | 32.0 | 7.5 |
| 20 | 20 | 10 | 46.5 | 7.5 |
| 20 | 20 | 20 | 47.5 | 7.5 |
| 20 | 20 | 40 | 47.5 | 7.5 |
| 20 | 20 | 80 | 47.5 | 7.5 |
| 20 | 20 | 100 | 47.5 | 7.5 |

According to Table 11, when the film thickness of the readout layer 3 was 3 nm, the CNR was low, and thus an improvement of the reproduction characteristic was not confirmed. The reason for this is that since the readout layer 3 was too thin, it was impossible to provide the readout layer 3 with such magnetic properties as to show in-plane magnetization at room temperature and perpendicular magnetization with an increase in temperature. In order to obtain a good CNR, it is necessary for the readout layer 3 to have a film thickness of not less than 5 nm. However, if the film thickness of the readout layer 3 exceeds 35 nm, the erasing magnetic field abruptly increases, and an erasing magnetic field of at least 36.5 kA/m is required, resulting in increases in the size of an erasing magnetic field generating device and the power consumption. With a current magneto-optical disk drive, in order to achieve a practical erasing magnetic field, it is necessary to arrange the film thickness of the readout layer to be 30 nm or less.

In the case where the film thickness of the readout layer 3 was 20 nm, the film thickness of the recording auxiliary layer 12 was 5 nm and the film thickness of the recording layer 5 was 5 nm, no reproduced signals were obtained. The reason for this is that since the magnetization direction of the readout layer 3 is determined by the leakage magnetic field produced from the recording auxiliary layer 12 and recording layer 5, if the total film thickness of the recording auxiliary layer 12 and recording layer 5 is reduced and the produced leakage magnetic field becomes smaller, the reproduction of recorded information cannot be performed. As is known from Table 11, in this example, both of the film thickness of the recording auxiliary layer 12 and of the recording layer 5 were arranged not to be less than 10 nm, i.e., the total film thickness of the recording auxiliary layer 12 and recording layer 5 was arranged not to be less than 20 nm.

Moreover, in Embodiments 1 and 2, in order to restrain an increase of the erasing magnetic field, the film thickness of the recording layer 5 was arranged to be 80 nm or less. On the other hand, in Embodiment 3, since the recording operation is lead by the recording auxiliary layer 12, there is no need to set the upper limit of the total film thickness of the recording auxiliary layer 12 and recording layer 5 in order to restrain the increase of the erasing magnetic field. However, the total film thickness of the recording auxiliary layer 12 and recording layer 5 is preferably arranged to be 200 nm or less because a great laser light intensity is required for recording if the total film thickness becomes too thick.

Next, in the structure of the disk A6, the film thickness of the metal film layer 4 was changed, and the CNR and erasing magnetic field when the mark length was 0.45 μm were measured. Table 12 shows the results of measurement.

TABLE 12

| Film thickness of metal film layer (nm) | CNR (dB) | Erasing magnetic field (kA/m) |
|---|---|---|
| 3 | 46.5 | 50.0 |
| 4 | 47.5 | 46.0 |
| 5 | 48.0 | 41.5 |
| 6 | 47.5 | 31.0 |
| 7 | 48.0 | 22.0 |
| 8 | 48.5 | 7.5 |
| 10 | 47.5 | 7.5 |
| 15 | 47.0 | 7.5 |
| 20 | 47.5 | 7.5 |
| 30 | 47.5 | 7.5 |
| 40 | 45.0 | 7.5 |
| 50 | 41.0 | 7.5 |

As is known from Table 12, when the film thickness of the metal film layer 4 is 5 nm or less, the erasing magnetic field abruptly increases. The reason for this is that when the film thickness of the metal film layer 4 is reduced, the distance between the readout layer 3 and the recording layer 5 and recording auxiliary layer 12 decreases. With a decrease in the distance between the readout layer 3 and the recording layer 5 and recording auxiliary layer 12, the influence of the leakage magnetic field produced from the readout layer 3 on the recording layer 5 and recording auxiliary layer 12 increases, and the erasing magnetic field increases. When the film thickness of the metal film layer 8 is not less than 8 nm, since the leakage magnetic field produced from the readout layer 3 does not affect the recording characteristic at all, the erasing magnetic field is determined only by the recording characteristic of the recording layer 5 and recording auxiliary layer 12, and shows a constant value of 7.5 kA/m.

An increase in the erasing magnetic field causes increases in the size of the magnetic field generating device and the power consumption of the magneto-optical disk drive. In the current magneto-optical disk drive, since the practical erasing magnetic field is not greater than 31 kA/m, it is necessary for the metal film layer 4 to have a film thickness of not less than 6 nm.

During reproduction, since the magnetization direction of the readout layer 3 is determined by the leakage magnetic field produced from the recording layer 5 and recording auxiliary layer 12, when the film thickness of the metal film layer 4 is increased to 50 nm, the leakage magnetic field produced from the recording layer 5 and recording auxiliary layer 12 does not sufficiently reach the readout layer 3, causing deterioration of the CNR. In order to obtain good signal quality, i.e., a high CNR, it is necessary to arrange the film thickness of the metal film layer 4 to be 40 nm or less.

EXAMPLE 8

Next, with the use of the structure of the disk A6 of Example 7, magneto-optical disks were fabricated by only changing the composition of the recording auxiliary layer 12, and their recording and reproduction characteristics were measured. The composition, compensation temperature and Curie temperature of the recording auxiliary layer 12 of each disk are shown in Table 13. The temperatures were measured in Celsius (° C.).

TABLE 13

|  | Composition | Compensation temp. | Curie temp. |
| --- | --- | --- | --- |
| Disk A7 | $Gd_{0.22}(Fe_{0.83}Co_{0.17})_{0.78}$ | — | 290 |
| Disk B7 | $Gd_{0.24}(Fe_{0.83}Co_{0.17})_{0.76}$ | — | 290 |
| Disk C7 | $Gd_{0.26}(Fe_{0.83}Co_{0.17})_{0.74}$ | 30 | 290 |
| Disk D7 | $Gd_{0.28}(Fe_{0.83}Co_{0.17})_{0.72}$ | 50 | 290 |
| Disk E7 | $Gd_{0.30}(Fe_{0.83}Co_{0.17})_{0.70}$ | 95 | 290 |

Like Example 8, the CNR was measured from each of the disks A7 to E7 using an optical pickup having a semiconductor laser with a wavelength of 680 nm under the optimum reproduction conditions when the mark length was 0.45 μm. The results of measurement, the magnetic field necessary for erasing a recording magnetic domain (erasing magnetic field), and the magnetic field necessary for forming a recording magnetic domain (recording magnetic field) are shown in Table 14.

TABLE 14

|  | CNR (dB) | Erasing magnetic field (kA/m) | Recording magnetic field (kA/m) |
| --- | --- | --- | --- |
| Disk A7 | 48.0 | 9.5 | 5.0 |
| Disk B7 | 48.0 | 7.5 | 7.0 |
| Disk C7 | 47.5 | 6.0 | 9.5 |
| Disk D7 | 46.0 | 4.0 | 25.0 |
| Disk E7 | 45.0 | 2.0 | 45.0 |

It was found by comparing the reproduction characteristics of the disks A7 to E7 that the CNR decreases in the order of from the disk A7 to E7. The reasons for this is that the CNR is gradually lowered as the compensation temperature of the recording auxiliary layer 12 gradually increases and the leakage magnetic field from the recording auxiliary layer 12 gradually decreases. However, since the recording layer 5 is placed adjacent to the recording auxiliary layer 12 and produces a sufficiently large leakage magnetic field, the lowering of the CNR is reduced.

Moreover, since the erasing magnetic field becomes smaller with an increase in the compensation temperature of the recording auxiliary layer 12, the higher the compensation temperature of the recording auxiliary layer 12, the more preferred result is obtained. However, as the compensation temperature of the recording auxiliary layer 12 increases, the recording magnetic field becomes larger. In the case of the disk E7, an impractical recording magnetic field as large as 45 kA/m is required.

For the reasons mentioned above, the magnetic properties of the recording auxiliary layer 12 are set so that the compensation temperature is not higher than 50° C. (for the disks C7 and D7), or the sublattice moment of transition metal is always greater than the sublattice moment of rare earth metal at temperatures between room temperature and the Curie temperature thereof (for the disks A7 and B7).

In the above-mentioned examples, AlN, Al, GdFeCo, TbDyFeCo, and GdFeCo were used as the transparent dielectric layer, metal film layer, readout layer, recording layer, and recording auxiliary layer, respectively. However, the materials for these layers are not necessarily limited to such materials.

As the transparent dielectric layer, it is possible to use transparent films with a high refractive index, such as SiN, SiAlN, and $TaO_2$.

As the metal film layer, it is possible to use metal films with a high reflectance, for example, films of Au, Ti, Ag, Cu and alloys of AlNi, AlTi, etc.

As the readout layer, it is possible to use a magnetic films which show in-plane magnetization at room temperature and perpendicular magnetization with an increase in temperature. Examples of such films are magnetic films containing a rare earth metal, Gd, as a main component, such as GdDyFeCo, GdTbFe, and GdTbFeCo.

As the recording layer, it is possible to use magnetic films containing a rare earth metal, Dy or Tb, as a main component, such as DyFeCo, TbFeCo, and GdTbFeCo.

As the recording auxiliary layer, it is possible to use magnetic films containing a rare earth metal, Gd, as a main component, such as GdDyFeCo, GdTbFe, and GdTbFeCo.

As described above, the first magneto-optical recording medium of the present invention is a magneto-optical recording medium constructed by layering a transparent dielectric layer, a readout layer showing in-plane magnetization at room temperature and perpendicular magnetization with an increase in temperature, a metal film layer, a recording layer made of a perpendicularly magnetized film, and a protective layer in this order on a substrate, and characterized in that the film thickness of the readout layer is between 5 nm and 30 nm, the film thickness of the metal film layer is between 6 nm and 40 nm, and the film thickness of the recording layer is between 20 nm and 80 nm.

In this structure, the film thickness of the readout layer is so thin as not to be more than 30 nm, the leakage magnetic field produced from the readout layer is small. In addition, since the readout layer and the recording layer is separated from each other by the metal film layer with a thickness of not less than 6 nm, the leakage magnetic field produced from the readout layer has an extremely small influence on the recording magnetic field characteristic.

Consequently, even when recording is performed with a small recording bit diameter and at a small recording bit interval, it is possible to obtain satisfactory signal quality and provide a magneto-optical recording medium which allows recording and erasure even with a small magnetic field.

Moreover, since the film thickness of the readout layer is thin, it is possible to use multiple interference and achieve higher signal quality.

Furthermore, since the reflectance is increased with the use of the metal film layer, it is possible to obtain still higher signal quality.

The second magneto-optical recording medium of the present invention is a magneto-optical recording medium constructed by layering a first transparent dielectric layer, a readout layer showing in-plane magnetization at room temperature and perpendicular magnetization with an increase in temperature, a second transparent dielectric layer, a metal film layer, a recording layer made of a perpendicularly magnetized film, and a protective layer in this order on a substrate, and characterized in that the film thickness of the readout layer is between 5 nm and 30 nm, the total film thickness of the second transparent dielectric layer and metal film layer is between 6 nm and 40 nm, and the film thickness of the recording layer is between 20 nm and 80 nm.

In this structure, the film thickness of the readout layer is so thin as not to be more than 30 nm, the leakage magnetic field produced from the readout layer is small. In addition, since the readout layer and the recording layer is separated from each other by the second transparent dielectric layer and metal film layer with a total thickness of not less than 6 nm, the leakage magnetic field produced from the readout layer has an extremely small influence on the recording magnetic field characteristic.

Consequently, even when recording is performed with a small recording bit diameter and at a small recording bit interval, it is possible to obtain satisfactory signal quality and provide a magneto-optical recording medium which allows recording and erasure even with a small magnetic field. Furthermore, this structure allows a lowering of the laser power and an increase in the CNR.

Additionally, since the film thickness of the readout layer is thin, it is possible to use multiple interference and obtain higher signal quality.

Furthermore, since the multiple interference effect is enhanced with the use of the second transparent dielectric layer and metal film layer, it is possible to obtain still higher signal quality.

The third magneto-optical recording medium of the present invention is based on the first or second magneto-optical recording medium, and characterized in that the compensation temperature $T_{wcomp}$ of the recording layer is not higher than 50° C., or the sublattice moment of transition metal is always greater than the sublattice moment of rare earth metal from room temperatures to the Curie temperature $T_{wc}$ of the recording layer.

With this structure, in the first or second magneto-optical recording medium, the temperature dependence of the magnitude of the leakage magnetic field produced from the recording layer is optimized against the reproduction characteristic. Therefore, even when recording is performed with a small recording bit diameter and at a smaller recording bit interval, it is possible to obtain satisfactory signal quality.

The fourth magneto-optical recording medium of the present invention is based on the first or second magneto-optical recording medium, and characterized in that the compensation temperature $T_{rcomp}$ of the readout layer is not lower than 180° C., or the sublattice moment of rare earth metal is always greater than the sublattice moment of transition metal from room temperatures to the Curie temperature $T_{rc}$ of the readout layer.

With this structure, in the first or second magneto-optical recording medium, the leakage magnetic field produced from the readout layer decreases during recording, it is possible to provide a magneto-optical recording medium which allows recording and erasure with a small magnetic field.

The fifth magneto-optical recording medium of the present invention is based on the first or second magneto-optical recording medium, and characterized in that a recording auxiliary layer whose Curie temperature is higher than the Curie temperature of the recording layer is formed between the recording layer and protective layer, and the total film thickness of the recording layer and recording auxiliary layer is not less than 20 nm.

In this structure, with the use of the recording auxiliary layer whose sensitivity to the magnetic field is higher than that of the recording layer in the first and second magneto-optical recording media, it is possible to provide a magneto-optical recording medium which allows recording and erasure with a small magnetic field.

The sixth magneto-optical recording medium of the present invention is based on the fifth magneto-optical recording medium, and characterized in that the compensation temperature of the recording auxiliary layer is not higher than 50° C., or the sublattice moment of transition metal is always greater than the sublattice moment of rare earth metal at temperatures between room temperature and the Curie temperature $T_{ic}$ of the recording auxiliary layer.

In this structure, since the magnetic properties of the recording auxiliary layer is optimized in the forth magneto-optical recording medium, it is possible to provide a magneto-optical recording medium which allows recording with a practical recording magnetic field.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a substrate;

a first transparent dielectric layer;

a readout layer showing in-plane magnetization at room temperature and perpendicular magnetization with an increase in temperature, said readout layer having a film thickness which is not less than 5 nm but is not more than 30 nm;

a metal film layer of a film thickness which is not less than 6 nm but is not more than 40 nm;

a recording layer formed by a perpendicularly magnetized film with a film thickness which is not less than 20 nm but is not more than 80 nm; and a protective layer, said first transparent dielectric layer, readout layer, metal film layer, recording layer, and protective layer being arranged in this order on said substrate, wherein the metal film layer is composed of an element selected from the group consisting of (i) a single metal and (ii) an alloy of at least two kinds of metals.

2. The magneto-optical recording medium according to claim 1, wherein said recording layer has a compensation temperature $T_{wcomp}$ which is not higher than 50° C.

3. The magneto-optical recording medium according to claim 1, wherein said recording layer has a compensation temperature $T_{wcomp}$ which is at least 50° C. lower than a temperature at which said readout layer shows a transition from in-plane magnetization to perpendicular magnetization.

4. The magneto-optical recording medium according to claim 1,
wherein, in said recording layer, a sublattice moment of transition metal is always greater than a sublattice moment of rare earth metal at temperatures between room temperature and a Curie temperature $T_{wc}$ of said recording layer.

5. The magneto-optical recording medium according to claim 1,
wherein said readout layer has a compensation temperature $T_{rcomp}$ which is not lower than 180° C.

6. The magneto-optical recording medium according to claim 1,
wherein said readout layer has a compensation temperature $T_{rcomp}$ which is at least 30° C. higher than a temperature at which said readout layer shows a transition from in-plane magnetization to perpendicular magnetization.

7. The magneto-optical recording medium according to claim 1,
wherein, in said readout layer, a sublattice moment of rare earth metal is always greater than a sublattice moment of transition metal at temperatures between room temperature and a Curie temperature $T_{rc}$ of said readout layer.

8. The magneto-optical recording medium according to claim 1,
wherein a recording auxiliary layer whose Curie temperature is higher than a Curie temperature of said recording layer is formed between said recording layer and said protective layer, and
a total film thickness of said recording layer and said recording auxiliary layer is not less than 20 nm.

9. The magneto-optical recording medium according to claim 8,
wherein the total film thickness of said recording layer and said recording auxiliary layer is not more than 200 nm.

10. The magneto-optical recording medium according to claim 8,
wherein said recording auxiliary layer has a compensation temperature which is not higher than 50° C.

11. The magneto-optical recording medium according to claim 8,
wherein said recording auxiliary layer has a compensation temperature which is at least 50° C. lower than a temperature at which said readout layer shows a transition from in-plane magnetization to perpendicular magnetization.

12. The magneto-optical recording medium according to claim 8,
wherein, in said recording auxiliary layer, a sublattice moment of transition metal is always greater than a sublattice moment of rare earth metal at temperatures between room temperature and the Curie temperature of said recording auxiliary layer.

13. A magneto-optical recording medium comprising:
a substrate;
a first transparent dielectric layer;
a readout layer showing in-plane magnetization at room temperature and perpendicular magnetization with an increase in temperature, said readout layer having a film thickness which is not less than 5 nm but is not more than 30 nm;
a second transparent dielectric layer;
a metal film layer;
a recording layer formed by a perpendicularly magnetized film with a film thickness which is not less than 20 nm but is not more than 80 nm; and
a protective layer,
said first transparent dielectric layer, readout layer, second transparent dielectric layer, metal film layer, recording layer, and protective layer being arranged in this order on said substrate,
a total film thickness of said second transparent dielectric layer and said metal film layer being in a range from 6 nm to 40 nm,
wherein the metal film layer is composed of an element selected from the group consisting of (i) a single metal and (ii) an alloy of at least two kinds of metals.

14. The magneto-optical recording medium according to claim 13,
wherein said recording layer has a compensation temperature $T_{wcomp}$ which is not higher than 50° C.

15. The magneto-optical recording medium according to claim 13,
wherein said recording layer has a compensation temperature $T_{wcomp}$ which is at least 50° C. lower than a temperature at which said readout layer shows a transition from in-plane magnetization to perpendicular magnetization.

16. The magneto-optical recording medium according to claim 13,
wherein, in said recording layer, a sublattice moment of transition metal is always greater than a sublattice moment of rare earth metal at temperatures between room temperature and a Curie temperature $T_{wc}$ of said recording layer.

17. The magneto-optical recording medium according to claim 13,
wherein said readout layer has a compensation temperature $T_{rcomp}$ which is not lower than 180° C.

18. The magneto-optical recording medium according to claim 13,
wherein said readout layer has a compensation temperature $T_{rcomp}$ which is at least 30° C. higher than a temperature at which said readout layer shows a transition from in-plane magnetization to perpendicular magnetization.

19. The magneto-optical recording medium according to claim 13,
wherein, in said readout layer, a sublattice moment of rare earth metal is always greater than a sublattice moment of transition metal at temperatures between room temperature and a Curie temperature $T_{rc}$ of said readout layer.

20. The magneto-optical recording medium according to claim 13,
wherein a recording auxiliary layer whose Curie temperature is higher than a Curie temperature of said recording layer is formed between said recording layer and said protective layer, and
a total film thickness of said recording layer and said recording auxiliary layer is not less than 20 nm.

21. The magneto-optical recording medium according to claim 20,
wherein the total film thickness of said recording layer and said recording auxiliary layer is not more than 200 nm.

22. The magneto-optical recording medium according to claim 20,
wherein said recording auxiliary layer has a compensation temperature which is not higher than 50° C.

23. The magneto-optical recording medium according to claim 20,
wherein said recording auxiliary layer has a compensation temperature which is at least 50° C. lower than a temperature at which said readout layer shows a transition from in-plane magnetization to perpendicular magnetization.

24. The magneto-optical recording medium according to claim 20,
wherein, in said recording auxiliary layer, a sublattice moment of transition metal is always greater than a sublattice moment of rare earth metal at temperatures between room temperature and the Curie temperature of said recording auxiliary layer.

25. The magneto-optical recording medium according to claim 1, wherein the metal film layer is selected from the group consisting of Al, Au, Ti, Ag, Cu, AlNi and AlTi.

26. The magneto-optical recording medium according to claim 13, wherein the metal film layer is selected from the group consisting of Al, Au, Ti, Ag, Cu, AlNi and AlTi.

27. A magneto-optical recording medium comprising:
a substrate;
a first transparent dielectric layer;
a readout layer;
a metal film layer composed of an element selected from the group consisting of (i) a single metal and (ii) an alloy of at least two kinds of metals; and
a recording layer;
said readout layer being located within a distance so that leakage flux from said recording layer reaches said readout layer, and a magnetization direction of said recording layer is copied to said readout layer; and
said first transparent dielectric layer, readout layer, metal film layer, and recording layer being arranged in this order on said substrate.

28. The magneto-optical recording medium according to claim 27, wherein a second transparent dielectric layer is placed between said readout layer and metal film layer.

29. The magneto-optical recording medium according to claim 28, wherein a protective layer is placed on a side of said recording layer, opposite to said substrate.

30. The magneto-optical recording medium according to claim 27, wherein said metal film layer is selected from the group consisting of Al, Au, Ti, Ag, Cu, AlNi, and AlTi.

31. The magneto-optical recording medium according to claim 27, wherein said recording layer has perpendicular magnetization, and
said readout layer shows perpendicular magnetization when the magnetization direction of said recording layer is copied thereto.

32. The magneto-optical recording medium according to claim 31, wherein said recording layer and readout layer are rare-earth and transition-metal alloys.

33. A magneto-optical reproduction method comprising the steps of:
A. preparing a magneto-optical recording medium including:
a substrate;
a first transparent dielectric layer;
a readout layer;
a metal film layer composed of a single metal or an alloy of two or more kinds of metals; and
a recording layer;
said readout layer being located within a distance so that leakage flux from said recording layer reaches said readout layer; and
said first transparent dielectric layer, readout layer, metal film layer, and recording layer being arranged in this order on said substrate; and
B. reproducing information by copying a magnetization direction of said recording layer to said readout layer.

* * * * *